US012809651B2

(12) United States Patent
Magariyama

(10) Patent No.: US 12,809,651 B2
(45) Date of Patent: Nov. 24, 2026

(54) INFORMATION PROCESSING APPARATUS AND STORAGE MEDIUM

(71) Applicant: CANON KABUSHIKI KAISHA, Tokyo (JP)

(72) Inventor: Sho Magariyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 237 days.

(21) Appl. No.: 18/637,528

(22) Filed: Apr. 17, 2024

(65) Prior Publication Data

US 2024/0354131 A1 Oct. 24, 2024

(30) Foreign Application Priority Data

Apr. 21, 2023 (JP) ................................ 2023-070432

(51) Int. Cl.
*G06F 9/451* (2018.01)

(52) U.S. Cl.
CPC .................................. *G06F 9/453* (2018.02)

(58) Field of Classification Search
CPC ...................................................... G06F 9/453
See application file for complete search history.

(56) References Cited

U.S. PATENT DOCUMENTS

| | | | | |
|---|---|---|---|---|
| 2014/0064882 A1* | 3/2014 | Sato | G06F 3/1205 412/19 |
| 2016/0059545 A1* | 3/2016 | Watanabe | B41J 2/04586 347/5 |
| 2019/0114119 A1 | 4/2019 | Kawasaki | |
| 2021/0405944 A1* | 12/2021 | Kawano | G06F 3/1258 |
| 2023/0205472 A1* | 6/2023 | Hayashi | G06F 3/1208 358/1.15 |

FOREIGN PATENT DOCUMENTS

| | | |
|---|---|---|
| JP | 2008134930 A | 6/2008 |
| JP | 2019074906 A | 5/2019 |
| JP | 2023034953 A | 3/2023 |

* cited by examiner

*Primary Examiner* — Andrea C Leggett
(74) *Attorney, Agent, or Firm* — ROSSI, KIMMS & McDOWELL LLP

(57) ABSTRACT

An information processing apparatus executes an extension application program for extending a function of a print data generation software that can be commonly used with respect to a plurality of different print apparatuses, acquire a print setting of a print job; determine, based on the acquired print setting, whether to display guidance on a method of setting a sheet on a print apparatus that executes printing based on the print job; and display the guidance on the method of setting the sheet on a display unit of the information processing apparatus in a case where it has been determined that the guidance is to be displayed.

12 Claims, 15 Drawing Sheets

FIG. 7A

701

```xml
<?xml version="1.0" encoding="UTF-8"?>
<psf:PrintTicket xmlns:psf="http://schemas.microsoft.com/windows/2003/08/printing/printschemaframework"
  ...
  <psf:Feature name="psk:PageMediaSize">   702
    <psf:Option name="psk:JapanChou3Envelope">
      <psf:ScoredProperty name="psk:MediaSizeWidth">
        <psf:Value xsi:type="xsd:integer">120000</psf:Value>
      </psf:ScoredProperty>
      <psf:ScoredProperty name="psk:MediaSizeHeight">
        <psf:Value xsi:type="xsd:integer">235000</psf:Value>
      </psf:ScoredProperty>
    </psf:Option>
  </psf:Feature>
  <psf:Feature name="psk:JobInputBin">   703
    <psf:Option name="psk:AutoSelect"/>
  </psf:Feature>
  <psf:Feature name="psk:PageBorderless">
    <psf:Option name="psk:None"/>
  </psf:Feature>
  <psf:Feature name="psk:PageMediaType">   704
    <psf:Option name="psk:EnvelopePlain"/>
  </psf:Feature>
```

FIG. 7B

```
<psf:Feature name="psk:JobOutputBin">
  <psf:Option name="ns0001:FaceUp"/>
</psf:Feature>
<psf:Feature name="psk:JobPageOrder">
  <psf:Option name="psk:Reverse"/>
</psf:Feature>
<psf:Feature name="psk:PageOrientation">
  <psf:Option name="psk:Portrait"/>
</psf:Feature>
<psf:Feature name="psk:PageOutputQuality">
  <psf:Option name="psk:Draft"/>
</psf:Feature>
<psf:Feature name="psk:DocumentCollate">
  <psf:Option name="psk:Collated"/>
</psf:Feature>
<psf:Feature name="psk:PageScaling">
  <psf:Option name="ns0001:None"/>
</psf:Feature>
<psf:Feature name="psk:JobDuplexAllDocumentsContiguously">
  <psf:Option name="psk:OneSided"/>
</psf:Feature>
<psf:Feature name="psk:PageResolution">
```

FIG. 7C

```xml
    <psf:Option name="ns0001:DPI600x600">
      <psf:ScoredProperty name="psk:ResolutionX">
        <psf:Value xsi:type="xsd:integer">600</psf:Value>
      </psf:ScoredProperty>
      <psf:ScoredProperty name="psk:ResolutionY">
        <psf:Value xsi:type="xsd:integer">600</psf:Value>
      </psf:ScoredProperty>
    </psf:Option>
  </psf:Feature>
  <psf:Feature name="psk:PageOutputColor">
    <psf:Option name="psk:Color">
      <psf:ScoredProperty name="psk:DeviceBitsPerPixel">
        <psf:Value xsi:type="xsd:integer">1</psf:Value>
      </psf:ScoredProperty>
      <psf:ScoredProperty name="psk:DriverBitsPerPixel">
        <psf:Value xsi:type="xsd:integer">1</psf:Value>
      </psf:ScoredProperty>
    </psf:Option>
  </psf:Feature>
</psf:PrintTicket>
```

INFORMATION PROCESSING APPARATUS AND STORAGE MEDIUM

BACKGROUND OF THE INVENTION

Field of the Invention

The present invention relates to an information processing apparatus and a storage medium.

Description of the Related Art

A configuration has been known in which a print instruction is issued to a print apparatus connected to a host computer with use of a printer driver that has been installed on the host computer as software for controlling the print apparatus. An operating system (OS), which is basic software, is installed on the host computer; the printer driver is configured in conformity with the specifications defined by this OS, and is put into operation when called up by the OS. Also, a vendor that provides the print apparatus provides the printer driver that conforms with the specifications of the OS, thereby allowing a user to instruct the print apparatus to perform printing with use of this OS.

In recent years, Windows® provides a standard class driver that can be commonly used by print apparatuses provided by a plurality of vendors (hereinafter also referred to as a "standard driver"). As this standard driver is enclosed in a package of an OS, connecting an arbitrary print apparatus to a host computer equipped with this OS enables printing to be performed in a simplified manner using this print apparatus. In this way, print data can be transmitted to and printed by the connected print apparatus without separately installing a model-specific printer driver appropriate for the connected print apparatus, which is highly convenient. Also, the standard driver can designate print functions in accordance with capability information (Print Device Capabilities or PDC hereinafter) that has been generated based on information acquired from the connected print apparatus. This allows a user who uses the standard driver to designate print functions corresponding to the capabilities of the connected print apparatus, even though one standard driver is used.

Furthermore, an application for extension of functions (hereinafter also referred to as an "extension application program" or "extension application") can be associated with the standard driver. This extension application can be provided by a vendor that provides the print apparatus. The extension application can provide functions (extension functions) that cannot be realized solely by the standard driver by editing the PDC generated by the standard driver. Japanese Patent Laid-Open No. 2019-74906 describes a technique to extend such functions as a stamp function with use of an extension application.

When setting a sheet to be used in a print apparatus, in the case of a sheet whose sheet orientation has a meaning, such as an envelope and the like, there is a possibility that printing fails if the sheet is set in the wrong orientation. However, with the aforementioned standard driver, a reminder for causing a user to implement a correct setting method on a printer body cannot be issued with respect to a directional sheet such as an envelope, thereby giving rise to the possibility that the sheet is set in the wrong orientation and printing fails.

SUMMARY OF THE INVENTION

The present invention enables realization of a technique that allows a reminder to be issued to a user in a case where a print setting of print data does not match a print setting of a print apparatus when executing printing with use of an extension application program.

One aspect of the present invention provides a non-transitory computer-readable storage medium storing an extension application program for extending a function of a print data generation software that can be commonly used with respect to a plurality of different print apparatuses, and for causing a computer to execute each step in a method of controlling an information processing apparatus, the method comprising: acquiring a print setting of a print job; determining, based on the acquired print setting, whether to display guidance on a method of setting a sheet on a print apparatus that executes printing based on the print job; and displaying the guidance on the method of setting the sheet on a display unit of the information processing apparatus in case where it has been determined that the guidance is to be displayed.

Another aspect of the present invention provides an information processing apparatus that executes an extension application program for extending a function of a print data generation software that can be commonly used with respect to a plurality of different print apparatuses, the information processing apparatus comprising: one or more memory devices that store a set of instructions; and one or more processors that execute the set of instructions to: acquire a print setting of a print job; determine, based on the acquired print setting, whether to display guidance on a method of setting a sheet on a print apparatus that executes printing based on the print job; and display the guidance on the method of setting the sheet on a display unit of the information processing apparatus in a case where it has been determined that the guidance is to be displayed.

Further features of the present invention will be apparent from the following description of exemplary embodiments with reference to the attached drawings.

BRIEF DESCRIPTION OF THE DRAWINGS

FIGS. 7A to 7C is a diagram showing an example of print setting information (PT) for a case where the guidance on the sheet setting method is displayed in the first embodiment.

DESCRIPTION OF THE EMBODIMENTS

Figure 1:
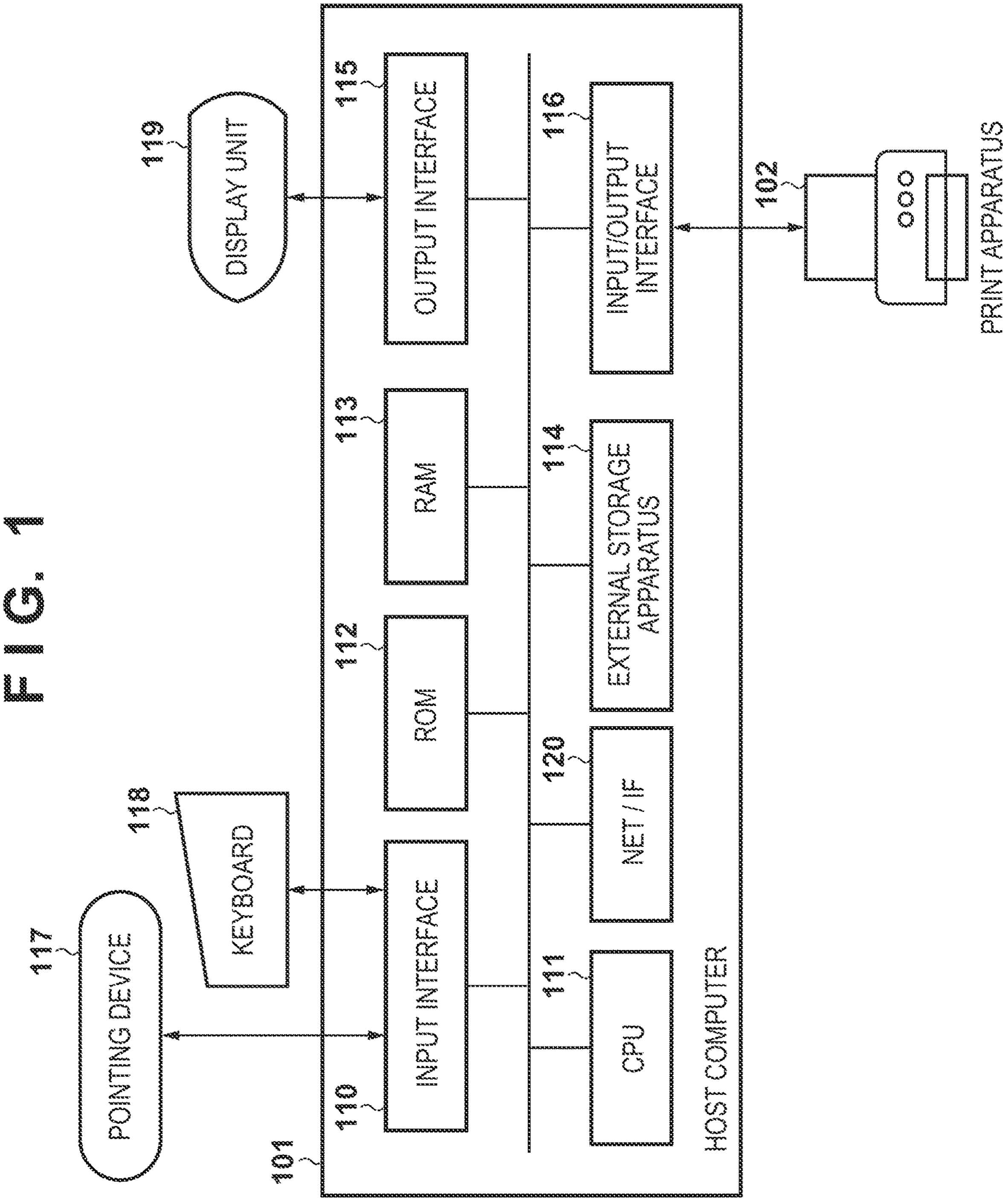
FIG. 1 is a block diagram illustrating a configuration of a print system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration of a print system according to a first embodiment.

This print system includes a host computer 101; the illustration of FIG. 1 mainly focuses on a hardware configuration of the host computer 101. The host computer 101 is one example of an information processing apparatus. The host computer 101 includes an input interface 110, a CPU 111, a ROM 112, a RAM 113, an external storage apparatus 114, an output interface 115, an input/output interface 116, and a network interface (NET I/F) 120. Input devices such as a keyboard 118 and a pointing device 117 are connected to the input interface 110, and a display device such as a display unit 119 is connected to the output interface 115. The NET I/F 120 performs control for performing data transfer to/from an external device via a network. Note that although the display unit 119, the pointing device 117, and the keyboard 118 are illustrated as examples of devices other than the host computer 101 in the example of FIG. 1, they may be included in the host computer 101. Also, the display unit 119 may be a touch panel display that has functions of an input/output device. An initialization program is stored in the ROM 112. Various types of data including a group of application programs, an operating system (OS), print data generation software, and the like are stored in the external storage apparatus 114. The RAM 113 is used as, for example, a working memory when various types of programs stored in the external storage apparatus 114 are executed, thereby allowing the various types of programs to operate inside the host computer 101. Note that in the first embodiment, the later-described functions and processing of the host computer 101 are executed by the CPU 111 executing processing in accordance with the procedures of the programs stored in the ROM 112.

A print apparatus 102, which is an output device, is connected to the host computer 101 via the input/output interface 116. Although the example of FIG. 1 shows that the host computer 101 and the print apparatus 102 are separate entities by way of example, they may be configured as one information processing apparatus. Note that although an inkjet print apparatus that performs printing by ejecting ink onto a sheet surface will be described as an example of the print apparatus, printing may be executed using another method (e.g., an electrophotographic method).

Furthermore, the host computer 101 may be a desktop personal computer, a smartphone, a tablet terminal, or a notebook personal computer. The input/output interface 116 may be wired or wireless. In addition, the host computer 101 and the print apparatus 102 may be connected via a LAN or a WAN such as the Internet.

Figure 2A:
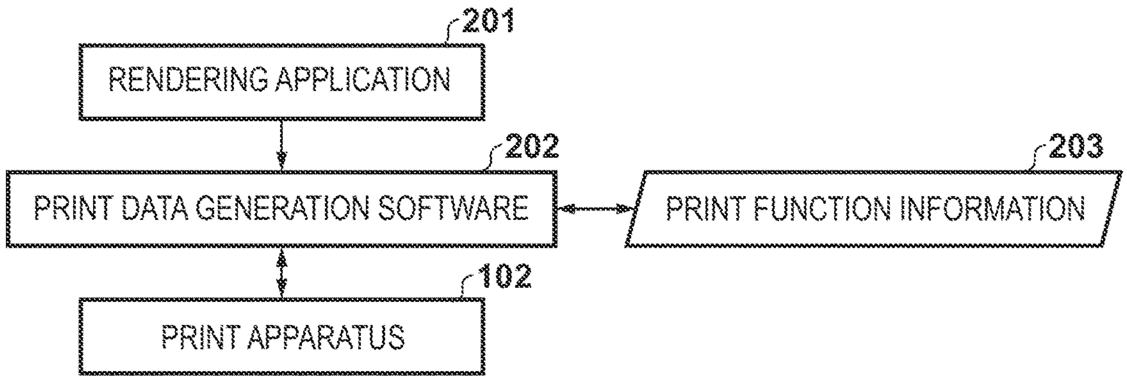
FIGS. 2A and 2B are functional block diagrams schematically showing a functional configuration of the print system according to an embodiment.
Figure 2B:
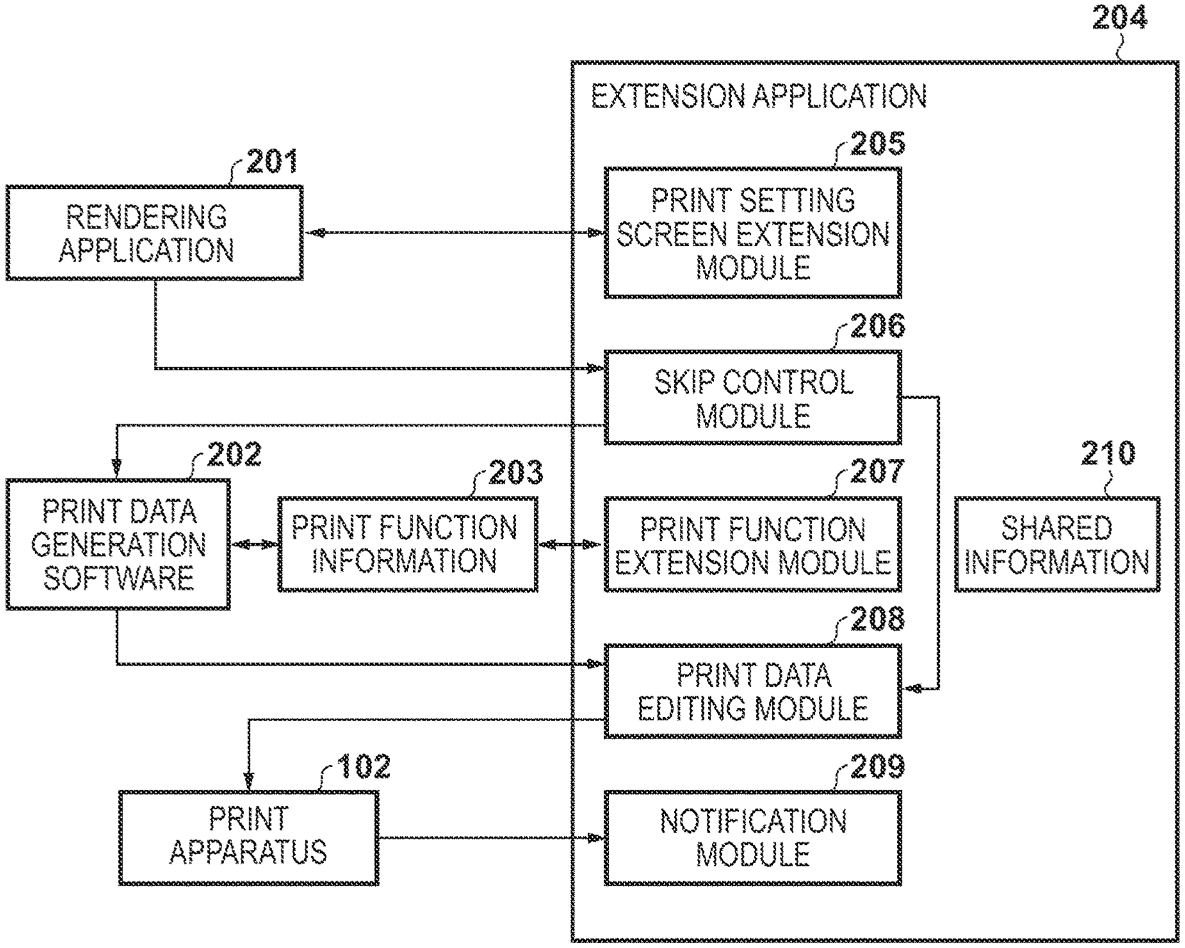

FIGS. 2A and 2B are functional block diagrams schematically showing a functional configuration of the print system according to an embodiment. Although the present description will be provided on the premise of the print system that uses the host computer 101 on which Windows® 11 of Microsoft® is installed as the OS, it is permissible to adopt a configuration in which Windows® 10 is also included.

FIG. 2A is a diagram showing a common configuration for a case where an extension application is not associated with print data generation software 202 and the print apparatus 102. That is to say, it is a diagram showing a configuration of the print system in which an extension application is not used.

On the other hand, FIG. 2B is a diagram showing a configuration of the print system according to the first embodiment in which an extension application 204 is associated with the print data generation software 202 and the print apparatus 102.

First, exemplary functions of a print system with a common configuration will be described using the host computer 101 as an example with reference to FIG. 2A.

The print system with the common configuration includes a rendering application 201 and the print data generation software 202. Also, print function information 203 is stored in the RAM 113 or the external storage apparatus 114. The rendering application 201 and the print data generation software 202 are programs that can operate on the host computer 101.

The rendering application 201 is software that creates a content to be printed (rendering data). Examples of the rendering application 201 include various types of applications operated by a user, such as a document creation application and a spreadsheet application. Upon receiving a print request from the user, the rendering application 201 issues a print instruction to the OS. This print instruction includes print setting information for issuing an instruction about operations of the print data generation software 202 and the print apparatus 102. This print setting information is also referred to as a Print Ticket (hereinafter abbreviated as "PT").

In order to set the print setting information (PT), the rendering application 201 can cause display of a print setting screen that is provided by one of the print data generation software 202, the OS, and the rendering application 201. This print setting screen includes setting items indicating print functions that can be set (hereinafter also referred to as "control items"), and control items indicating setting values thereof. Also, this print setting screen displays control items in accordance with capability information acquired from the print data generation software 202 (information that can be set as print settings). This capability information is also referred to as Print Capabilities (hereinafter abbreviated as "PC"). The print data generation software 202 determines PT and PC based on the print function information 203. The print function information 203 is data indicating all print functions that can be set, setting values thereof, and print functions describing an exclusive relationship among setting values. The print function information 203 is also referred to as Print Device Capabilities (PDC). The print function information 203 is included in a configuration file of the print data generation software 202, and is located in the external storage apparatus 114 as an unchangeable file. Alternatively, the print function information 203 can also be dynamically generated by the print data generation software 202.

Specifically, the print data generation software 202 or the OS can be configured to acquire attribute data of the print apparatus 102 from the print apparatus 102, and generate the print function information 203 in accordance with attribute information inside the acquired attribute data. In a case where the print function information 203 is generated dynamically, the generated print function information 203 can be edited. Note that the attribute data of the print apparatus 102 acquired from the print apparatus 102 is data of a response that is acquired by issuing a Get-Printer-Attributes operation according to the IPP to the print apparatus. The IPP refers to the Internet Print Protocol. This response includes attribute information indicating the functions that can be designated on the print apparatus 102 (capabilities of the print apparatus 102), and setting values related to this attribute information. Data of this response is stored in the RAM 113. With the foregoing configuration, the print data generation software 202 can be configured to allow the user to designate the print functions that can be used on the connected print apparatus 102 in accordance with the connected print apparatus 102. That is to say, even in a case where print apparatuses that have different functions from one another or print apparatuses developed by different vendors have been connected, the print data generation software 202 can be configured to allow the user to designate usable print functions in accordance with the connected print apparatuses.

Here, a description is given of a configuration in which the IPP Class Driver installed in Windows® 10 is used as the print data generation software 202. The IPP Class Driver is a print apparatus driver that executes print processing in accordance with the specifications of a standard print protocol called the IPP, and is enclosed in a package of the OS. The IPP Class Driver is not a specific print apparatus driver corresponding to the model of the connected print apparatus, but is a standard class driver that can be commonly used with respect to a plurality of print apparatuses. Also, the IPP Class Driver acquires attribute information of the connected print apparatus so that the user can designate print functions supported by the connected print apparatus, and generates the print function information 203 based on this information. In this way, the IPP Class Driver, which is the print data generation software 202, can dynamically generate the print function information 203 (PDC).

The print instruction output from the rendering application 201 includes print setting information (PT) that has been designated via a print setting screen displayed based on capability information PC based on such print function information 203 (PDC). Note that the print instruction output from the rendering application 201 includes data to be rendered in addition to the print setting information (PT).

The OS generates intermediate data (also referred to as input data) based on the print instruction output from the rendering application 201, and passes the intermediate data to the print data generation software 202. Note that data output by the rendering application 201 for printing is data in a Graphic Device Interface format (GDI format data), or data in an XML Paper Specification format (data in the XPS format).

In a case where the IPP Class Driver is used as the print data generation software 202, if data output from the rendering application 201 is data in the GDI format, the OS converts the data format. That is to say, the OS converts data in the GDI format output from the rendering application 201 into data in the XPS format. Then, this converted data in the XPS format is passed to the print data generation software 202 as intermediate data.

On the other hand, if data output from the rendering application 201 is data in the XPS format, the OS passes the data in the XPS format to the print data generation software 202 as intermediate data. Note that the intermediate data includes rendering data, which is information of an image to be formed on a sheet surface, and the print setting information (PT) set by the user. The print data generation software 202 converts the acquired intermediate data into print data that can be interpreted by the print apparatus 102, and transmits the print data to the print apparatus 102.

Note that the print data includes rendering data, which is information of an image to be formed on a sheet surface, and print setting attribute information that has been generated based on the print setting information set by the user (attribute information that designates print settings). The print setting attribute information includes attribute information indicating the functions that can be designated on the connected print apparatus (capabilities of the print apparatus), and setting values related to this attribute information.

The print apparatus 102 performs printing on a sheet surface based on the print data transmitted from the print data generation software 202. At this time, the print apparatus 102 forms rendering data included in the print data on the sheet surface through an operation conforming with the print setting attribute information included in the print data. The print setting attribute information includes, for example, a print grade (e.g., priority on the image quality or priority on the speed), attribute information for designating double-sided printing and the like, and setting values thereof. For example, in a case where the print setting attribute information includes attribute information that designates double-sided printing, the print apparatus 102 executes double-sided printing.

FIG. 2B is a diagram illustrating a case where the extension application 204 is associated with the print data generation software 202 and the print apparatus 102 in the first embodiment. Note that the configuration and processing that are not particularly mentioned below are equivalent to the configuration and processing of FIG. 2A.

The extension application 204 is software for extending the functions of the print data generation software 202, and is software that is not included (enclosed) in the OS in advance. Therefore, the user operates the host computer 101 to download the extension application 204 from a server via the Internet and install the same on the host computer 101. Alternatively, the extension application 204 may be automatically installed on the host computer 101 upon connection of the print apparatus 102 to the host computer 101.

Specifically, when the print apparatus 102 has been connected to the host computer 101, the OS acquires device identification information from the print apparatus 102. The OS may download the extension application 204 corresponding to the acquired device identification information from the server via the Internet, and install the same on the host computer 101. Thus, the print data generation software 202 and the extension application 204 are held in the host computer 101 as separate files. Note that the print data generation software 202 and the extension application 204 may be updated for a version upgrade; this update processing is also executed at separate timings. That is to say, the timing at which the host computer 101 acquires the print data generation software 202 is different from the timing at which the host computer 101 acquires the extension application 204.

Also, the trigger that causes the host computer 101 to acquire the print data generation software 202 is also different from the trigger that causes the host computer 101 to acquire the extension application 204. Note that when the extension application 204 has been installed, the OS associates the extension application 204 with the print data generation software 202 and the corresponding print apparatus 102.

The extension application 204 according to the first embodiment includes a print setting screen extension module 205, a skip control module 206, a print function extension module 207, a print data editing module 208, and a notification module 209. Also, the extension application 204 includes shared information 210 that can be commonly accessed by each module. The substance of the shared information 210 is a file stored in the external storage apparatus 114 or information stored in the RAM 113.

The extension application 204 writes and reads out information to and from the shared information 210 by using an application program interface (API) provided by the OS. Note that the extension application 204 may end its operations every time processing of each module ends. In this case, the OS activates the extension application 204 every time a request to use each module has been received. Furthermore, another mode is also possible. For example, the OS may cause the extension application 204 to end its operations when processing of the print setting screen extension module 205 has ended, but the OS may keep the extension application 204 activated when processing of the skip control module 206 has ended. In addition, during processing of each module, the extension application 204 may cancel the processing. In a case where the extension application 204 has cancelled processing, the OS deletes a job that is in process in a print queue.

Upon receiving a print request from the user, the rendering application 201 issues a print instruction to the OS. Similarly to the configuration of FIG. 2A, this print instruction includes print setting information (PT). In the configuration of FIG. 2B also, the rendering application 201 can cause display of a print setting screen for designating print setting information (PT), similarly to the configuration of FIG. 2A.

Furthermore, in the configuration of FIG. 2B, a print setting screen provided by the extension application 204 is displayed. Specifically, a print setting screen provided by the print setting screen extension module 205 included in the extension application 204 is displayed. That is to say, the print setting screen extension module 205 performs display control for a print setting screen. Note that whether a print setting screen provided by the print setting screen extension module 205 is displayed depends on a user's operation. Furthermore, the print setting screen extension module 205 can also extend the display items on a print setting screen provided by the OS based on information acquired from the print apparatus 102 and on information related to the rendering application 201. This function will be described later with reference to FIG. 4.

When the rendering application 201 has accepted the print request from the user and the print instruction has been issued to the OS, the OS activates the skip control module 206. The skip control module 206 executes control processing about whether to execute skip processing for skipping processing of the print data generation software 202. The skip control module 206 cannot acquire intermediate data and print setting information. After the skip control processing executed by the skip control module 206, the OS generates intermediate data based on the print instruction output from the rendering application 201, and passes this intermediate data to the print data generation software 202. Here, in a case where the skip control module 206 does not execute the skip processing, the intermediate data is converted by the print data generation software 202 into print data that can be interpreted by the print apparatus 102, and then passed to the print data editing module 208.

On the other hand, in a case where the print data generation software 202 executes the skip processing, the intermediate data generated by the OS is passed to the print data editing module 208 without being processed by the print data generation software 202. In this way, the intermediate data can be processed by the print data editing module 208. Examples of a case where it is preferable to skip the processing of the print data generation software 202 include a case where it is desired to execute enlargement/reduction processing in the print data editing module 208. Regarding this intermediate data, data can be held in a vector format. Data in the vector format undergoes less deterioration at the time of enlargement/reduction than data in a raster format does. Therefore, in a case where the print data generation software 202 outputs image data in the raster format, it is generally desirable to skip the processing of the print data generation software 202 and process the intermediate data in the print data editing module 208.

The print data editing module 208 edits the intermediate data passed from the OS or the print data processed by the print data generation software 202. Regarding the content of this editing, in the case of poster printing for example, the print data editing module 208 changes a layout of the intermediate data or the print data based on print setting information related to poster printing received from the OS. Poster printing denotes, for example, printing where data corresponding to N pages is assigned to one page, and is called Nin1, N-up, or the like (N refers to the number of pages).

Also, the print data editing module 208 can display a UI screen on the display unit 119, and display the layout result of the intermediate data or the print data as a preview screen. After the print data editing module 208 has edited the print data, this print data is passed to the print apparatus 102 via the OS. The print apparatus 102 performs printing on a sheet surface based on the accepted print data. Note that in a case where the skip control module 206 has caused the processing of the print data generation software 202 to be skipped, the print data editing module 208 may convert the intermediate data received from the OS into print data that can be interpreted by the print apparatus 102.

Furthermore, the extension application 204 includes the print function extension module 207. The print function extension module 207 can edit the print function information 203 (PDC) generated by the print data generation software 202 or the OS. That is to say, even when the print function information 203 is located in the external storage apparatus 114 as an unchangeable file, the print function extension module 207 can change this print function information 203.

As such, the extension application 204 has a function of editing the print function information 203 (PDC). The print function extension module 207 can add functions provided by the extension application 204. Furthermore, the print function extension module 207 can also add functions that are supported by the print apparatus 102 but are not supported by the print data generation software 202, add an exclusive relationship among setting values of print functions, and the like.

The OS activates the print function extension module 207 when the extension application 204 is associated with the print apparatus 102 and the print data generation software 202 for the first time. Also, the OS may activate the print function extension module 207 at any other timing such as when the OS has been activated. In this way, in a case where the functions related to printing are extended by adding an option apparatus (e.g., a finisher or the like) to the print apparatus 102 later, the print function extension module 207 can detect the extended functions and add them to the print function information 203.

Furthermore, the extension application 204 includes the notification module 209. The notification module 209 can display a notification to the user in response to the occurrence of an error in the print apparatus 102. For example, when an out-of-sheet error has occurred in the print apparatus 102, the print data generation software 202 detects this error. Then, the OS causes the display unit 119 to display a message using a notification function called a toast notification, which is a function of the OS. When the user has pressed this toast notification, the OS calls up the notification module 209 of the extension application 204, and a UI screen of the notification module 209 is displayed. This UI screen of the notification module 209 can display, for example, a detailed message regarding the out-of-sheet error and/or a method of loading sheets, among others. Note that pressing of the toast notification includes a touch or tap operation on the touch panel display, in addition to a click operation performed by the pointing device or the like.

Note that the configuration of the extension application 204 for realizing the first embodiment is not limited to including all of the aforementioned functions (modules), and may include only a part of these functions or include other functions. Furthermore, the extension application 204 may also be simply referred to as print software.

As described above, the extension application 204 according to the first embodiment includes at least one of the following discrete functions. The discrete functions denote the function of displaying a print setting screen (the print setting screen extension module 205), and the function of controlling whether to skip the processing of the print data generation software 202 (the skip control module 206). The discrete functions also denote the function of editing print data output to the print apparatus (the print data editing module 208), and the function of extending the functions that can be designated on the print data generation software 202 (the print function extension module 207). The discrete functions further denote the function of displaying a UI screen in response to the occurrence of an error in the print apparatus 102 (the notification module 209).

Figures 3A, 3B, 3C:
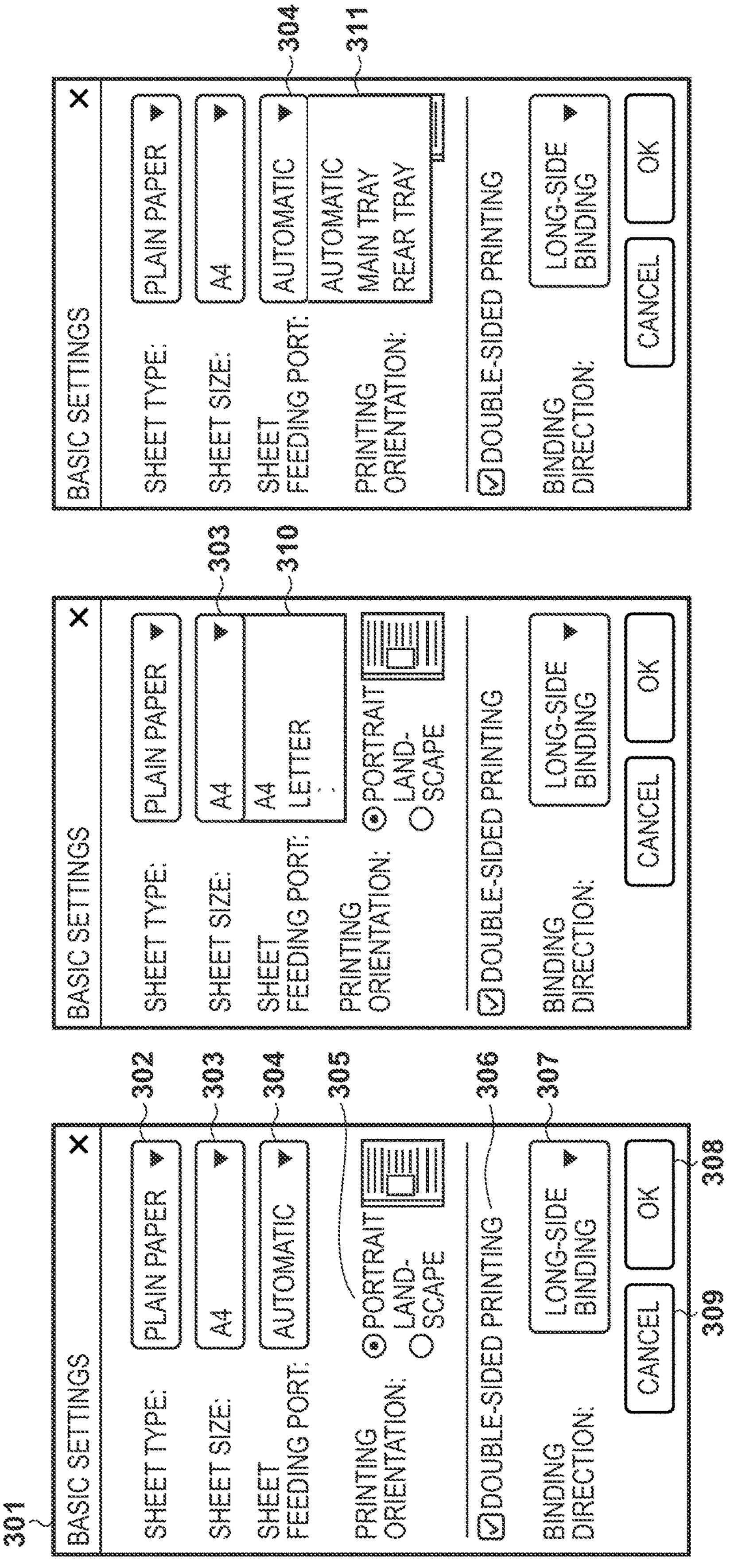
FIGS. 3A to 3C are diagrams showing examples of a print setting screen that is displayed by a print setting screen extension module of an extension application according to the first embodiment.

FIGS. 3A to 3C are diagrams showing examples of a print setting screen displayed by the print setting screen extension module 205 of the extension application 204 according to the first embodiment. This print setting screen is generated in accordance with capability information (PC) based on the PDC 203 edited by the print function extension module 207.

FIG. 3A shows a print setting screen 301; this screen is an example of a screen displayed by the print setting screen extension module 205. The print setting screen extension module 205 is called up by the OS when the user has issued an instruction for displaying a print setting screen on the rendering application 201. The print setting screen extension module 205 displays a screen that allows the user to designate setting values of print functions that can be designated on the print data generation software 202 based on the capability information (PC) that can be acquired from the OS and on the shared information 210. A control 302 is a control item with which a sheet type to be used in printing can be set; for example, such items as plain paper and photo paper can be set therewith. A control 303 is a control item with which a sheet size to be used in printing can be set; for example, such items as A4 and letter can be set therewith. In FIG. 3A, “plain paper” and “A4” are displayed as the sheet type and the sheet size to be used in printing, respectively.

FIG. 3B is a diagram showing a display state in a case where the control 303 has been expanded; a list 310 displays a list of sheet sizes that can be selected by the user.

A control 304 of FIG. 3A is a control with which a sheet feeding port for a print sheet in the print apparatus 102 can be set; for example, such items as a main tray and a rear tray can be set therewith. In FIG. 3A, “automatic” is displayed. FIG. 3C is a diagram showing a display state in a case where the control 304 has been expanded; a list 311 displays a list of sheet feeding ports that can be selected by the user. This list 311 shows “automatic”, “main tray”, and “rear tray”, and one of them can be selected.

A control 305 of FIG. 3A is a control item with which the orientation of printing can be set; portrait and landscape settings can be configured therewith. In FIG. 3A, “portrait” is selected. A control 306 is a control item with which double-sided printing can be switched between enabled and disabled states; in FIG. 3A, “double-sided printing” is selected. A control 307 is a control item with which the binding direction in double-sided printing can be set; for example, such items as binding at long edge and binding at short edge can be set therewith. In FIG. 3A, “binding at long edge” is selected. A control 309 is a cancel button, which closes the screen without reflecting the settings. A control 308 is an OK button, which closes the screen while reflecting the settings on this screen.

Figure 4:
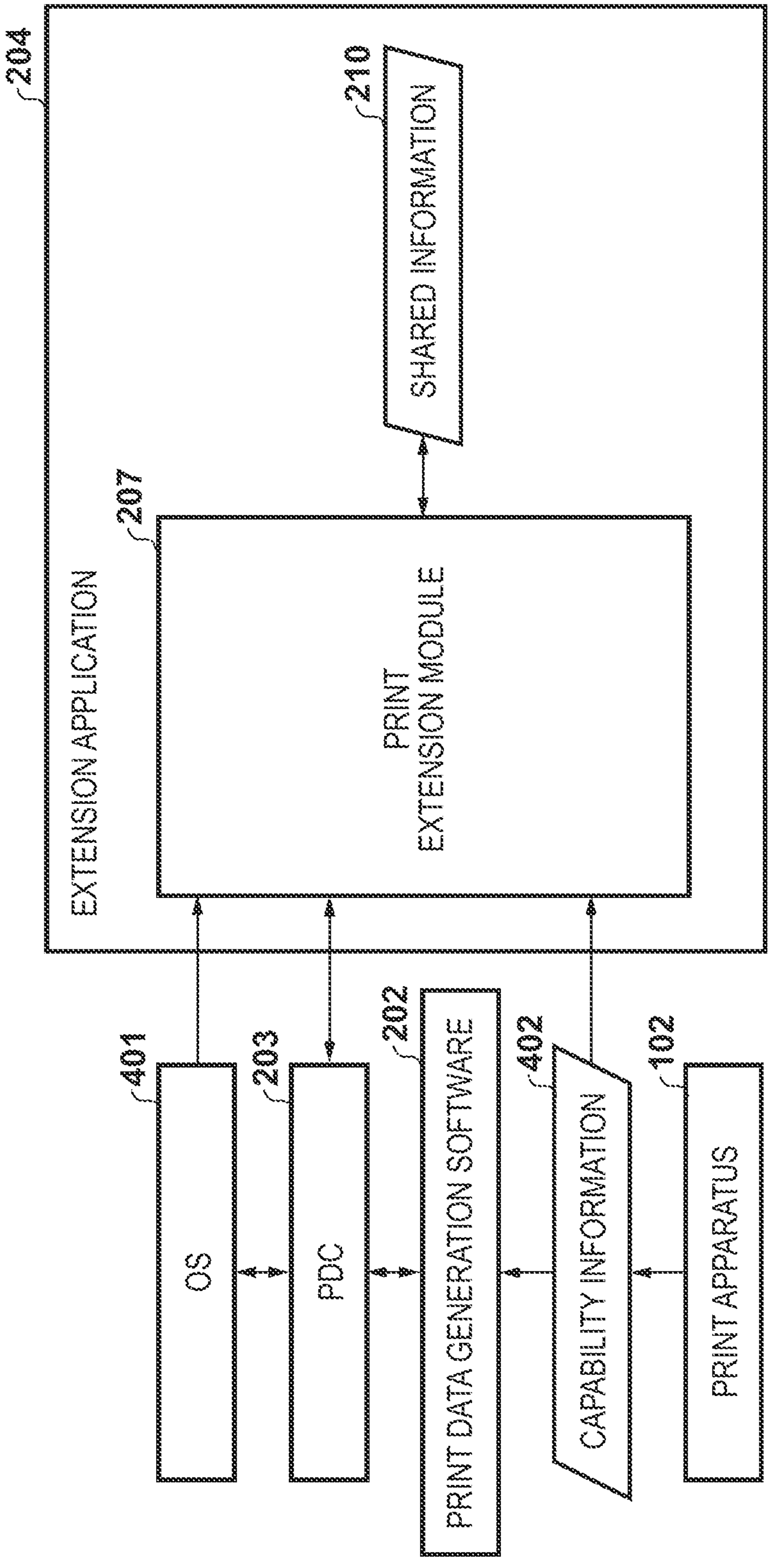
FIG. 4 is a block diagram illustrating PDC editing processing executed by a print function extension module in the print system according to the first embodiment.

FIG. 4 is a block diagram illustrating PDC editing processing executed by the print function extension module 207 in the print system according to the first embodiment.

The print data generation software 202 acquires capability information 402 of the print apparatus 102 connected to the host computer 101, and generates PDC 203 based on this information. The capability information 402 acquired from the print apparatus 102 is information that includes, for example, information that can be set by the user as print settings when performing printing on the print apparatus 102. An OS 401 issues a request to edit the PDC 203 to the print function extension module 207 of the extension application 204 at, for example, a timing at which the extension application 204 has been associated with a print queue for the print apparatus 102. The OS 401 issues a request to edit the PDC 203 also at, for example, a timing at which the print setting screen has been opened by the print setting screen extension module 205, in addition to a timing at which the extension application 204 has been associated for the first time.

Upon accepting the request to edit the PDC from the OS 401, the print function extension module 207 acquires the PDC 203 generated by the print data generation software 202 and starts editing the PDC 203. The details of extension of print functions through the edition of the PDC 203 will be described below.

Figure 5:
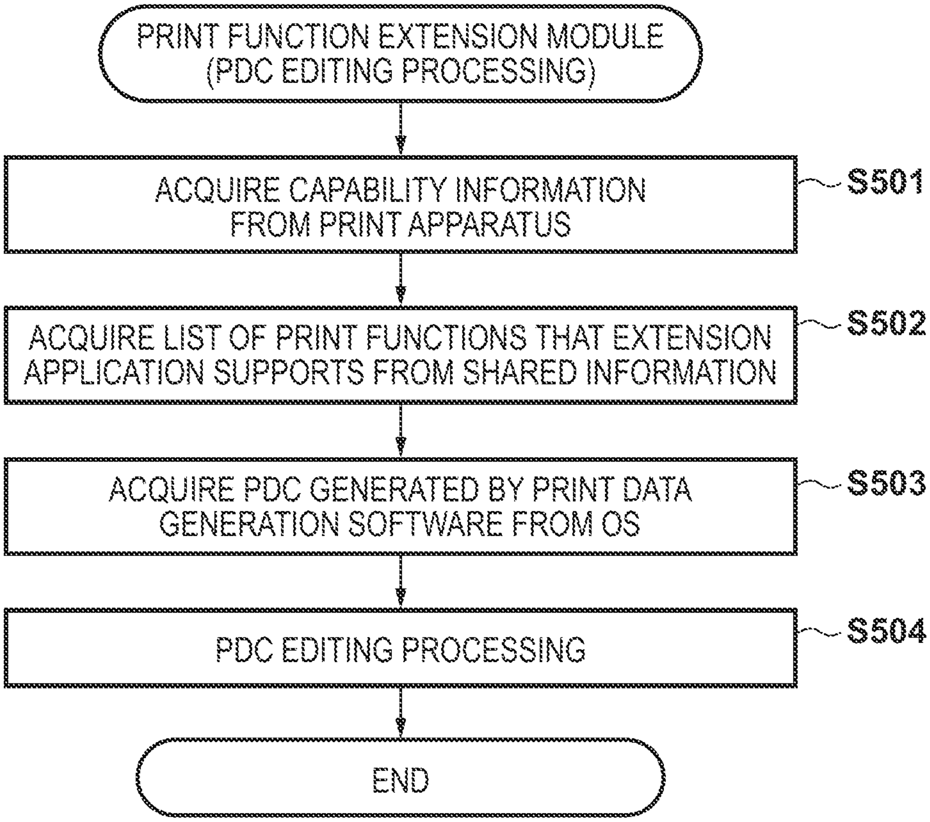
FIG. 5 is a flowchart illustrating main processing that is included in the PDC editing processing executed by the print function extension module in the print system according to the first embodiment.

FIG. 5 is a flowchart illustrating main processing that is included in the PDC editing processing executed by the print function extension module 207 in the print system according to the first embodiment. As this processing is realized by the CPU 111 functioning as the print function extension module 207, the following description will be provided under the assumption that the CPU 111 is the main executor of each process. The processing shown in the flowchart of FIG. 5 is started when the extension application 204 has received a PDC editing instruction from the OS 401.

In step S501, the CPU 111 acquires capability information from the print apparatus 102. The capability information 402 is included in a response that is acquired by issuing a Get-Printer-Attributes operation according to the IPP to the print apparatus 102. Also, this capability information 402 includes attribute information indicating the functions (Features) that can be designated on the print apparatus 102, and setting values (Options) related to this attribute information. Note that the Feature names and the Option names used in the following description are merely examples, and other names (information indicating functions) and setting values may be used.

Next, processing proceeds to step S502, and the CPU 111 acquires a list of print functions supported by the extension application 204 from the shared information 210. The list of the print functions supported by the extension application 204 is stored in the shared information 210, and this list includes all of the print functions that can be processed by the extension application 204 and setting values thereof. The list of the print functions supported by the extension application 204 includes the functions that can be set at the time of printing, such as sheet sizes and medium (sheet types), and setting values that can be set with respect to the respective functions. Note that the list of the print functions supported by the extension application 204 may be updated through, for example, an update of the extension application 204.

Next, processing proceeds to step S503, and the CPU 111 acquires the PDC 203 generated by the print data generation software 202 from the OS 401. The PDC 203 generated by the print data generation software 202 is generated based on the capability information that is acquired from the print apparatus 102 as a result of execution of the print data generation software 202.

Next, processing proceeds to step S504, and the CPU 111 extends print functions by adding, to the PDC 203, candidates for the setting values (Options) of the functions (Features) that can be designated on the print apparatus 102 among the print functions supported by the extension application 204.

Now, the user designates print settings including the extended print settings from the print setting screen 301 of FIG. 3A or the print setting screen of the rendering application 201, and performs printing with respect to a print queue associated with the extension application 204. As a result, the skip control module 206 is called up by the OS 401. The skip control module 206 can control whether to skip the processing of the print data generation software 202.

The first embodiment will be described in relation to a configuration in which the conversion from intermediate data into print data is performed in the print data editing module 208 rather than in the print data generation software 202. However, the present invention is not limited by this, and the intermediate data may be converted by the print data generation software 202. In the first embodiment, the skip control module 206 performs skip control for the print data generation software 202. When the skip control module 206 has ended its processing, the OS 401 passes the intermediate data to the print data generation software 202. Note that although the first embodiment has a configuration in which the intermediate data is passed to the print data generation software 202 regardless of whether the skip control is performed, it may have a configuration in which the intermediate data is passed directly to the print data editing module 208 when the skip control is performed. Also, it is assumed in the first embodiment that the skip control module 206 does not perform display on the display unit 119. The intermediate data is passed to the print data generation software 202, and the processing of the print data generation software 202 is skipped based on the skip control performed by the skip control module 206. Thereafter, the OS 401 passes the intermediate data to the print data editing module 208.

Figure 6:
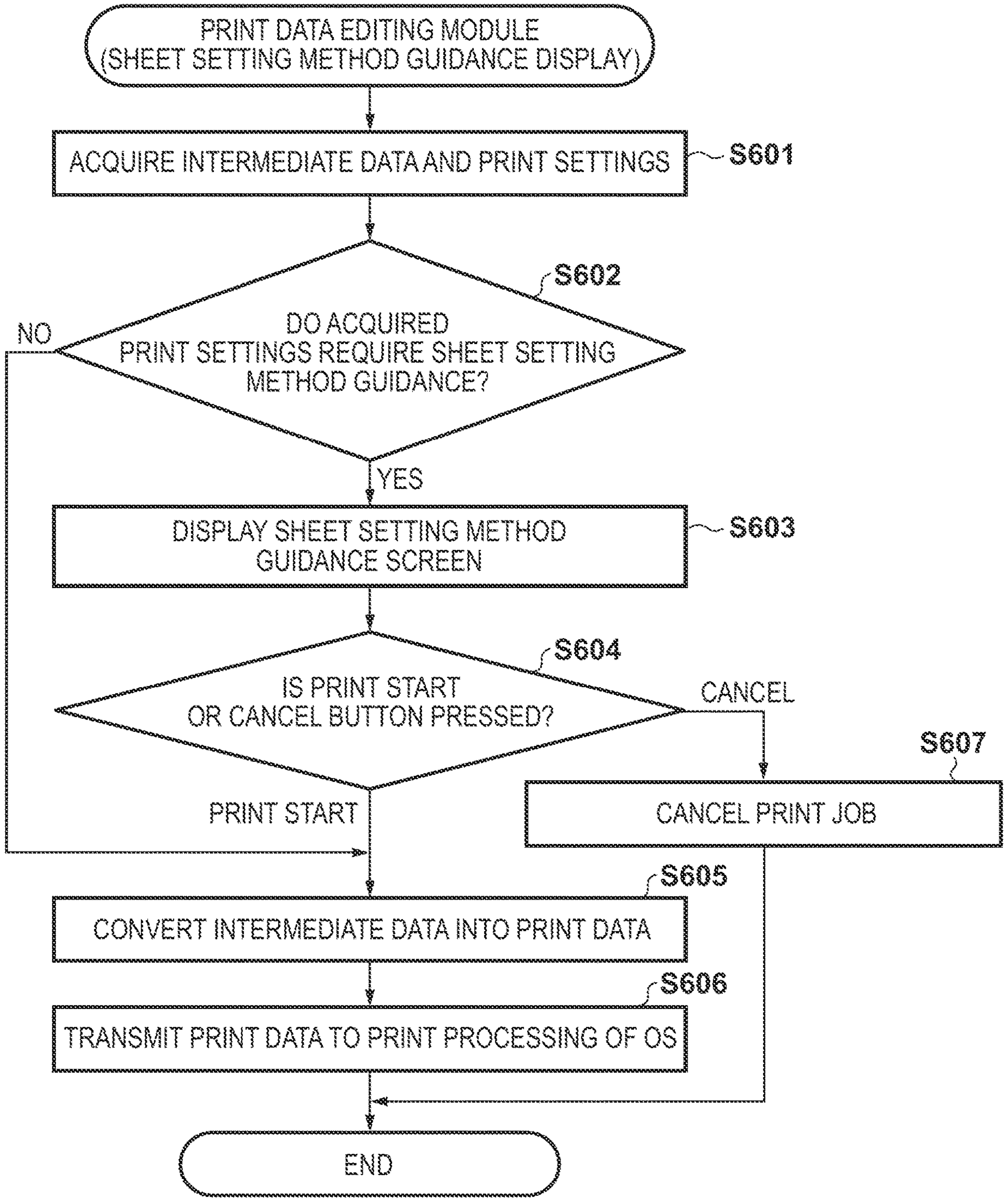
FIG. 6 is a flowchart illustrating processing of a print data editing module for displaying guidance on a sheet setting method in the print system according to the first embodiment.

FIG. 6 is a flowchart illustrating processing of the print data editing module 208 for displaying guidance on a sheet setting method in the print system according to the first embodiment. Note that as each processing step shown in this flowchart is realized by the CPU 111 executing the extension application 204 and each module, the CPU 111 will be described as a main executor of the processing. The processing shown in this flowchart is started when the print data editing module 208 has received intermediate data from the print data generation software 202.

First, in step S601, the CPU 111 that executes the print data editing module 208 acquires the intermediate data received from the print data generation software 202 and print settings included in this intermediate data. Next, processing proceeds to step S602, and the CPU 111 determines whether to display guidance on a sheet setting method on the print apparatus to be used in printing based on the print settings acquired in step S601. The combinations of a sheet type and a sheet size to be shown in the guidance, which act as the criteria for determination of whether to display the guidance here, are set and stored in the shared information 210 in advance. Note that although the first embodiment will be described using printing of an envelope as an example, it may be configured to incorporate any combination of sheet settings as long as a sheet has an orientation.

Normally, when printing is performed using a sheet that is plain paper of an A4 size, as this sheet does not have up-down and front-back orientations, there is no need to pay attention to the sheet setting method on the print apparatus 102. In contrast, in the case of printing of an envelope, if the envelope is set on the rear tray of the print apparatus 102 in the direction in which a flap is arranged, there is a possibility that the sheet size is erroneously determined and the printing positions are displaced. Furthermore, also in a case where printing frames for a postal code exist, as with a postcard and the like, a similar outcome will be yielded if the sheet is set in a wrong up-down orientation.

In step S602, the CPU 111 determines whether it is necessary to display a guidance screen regarding the sheet setting method; if the display of the guidance screen has been determined to be unnecessary, processing proceeds to step S605, and the CPU 111 converts the intermediate data of the job from the XPS format into the PDL format, which is print data that can be interpreted by the print apparatus 102. Then, processing proceeds to step S606, the CPU 111 passes the print data converted in step S605 to the OS 401, and the OS 401 transmits the print data to the print apparatus 102. Consequently, the print apparatus 102 performs printing.

On the other hand, if the CPU 111 has determined that it is necessary to display the guidance on the sheet setting method in step S602, processing proceeds to step S603. In step S603, the CPU 111 that executes the print data editing module 208 displays the guidance screen regarding the sheet setting method. In this way, the method of setting the envelope on the print apparatus 102 can be visually presented to the user. Once the setting of the envelope on the print apparatus 102 has been completed, processing proceeds to step S604. In step S604, when start of printing has been selected on this screen, the CPU 111 proceeds to step S605 and executes the above-described processing; when cancel has been selected, processing proceeds to step S607. In step S607, the CPU 111 executes processing for cancelling the print job, and ends the present processing.

FIGS. 7A to 7C is a diagram showing an example of print setting information (PT) 701 for a case where the guidance on the sheet setting method is displayed in the first embodiment.

The CPU 111 acquires this print setting information together with the intermediate data in step S601. Reference numeral 702 designates a Japanese chou 3 envelope as a sheet size. Reference numeral 703 is the setting of the sheet feeding port of the print apparatus 102, and it is set at "auto" here. Reference numeral 704 designates a sheet type; here, it designates an envelope.

In this case, in step S602, whether to proceed to processing of step S603 is determined based on this PT 701. In the first embodiment, it is assumed that the condition for displaying the guidance on the sheet setting method in step S603 is that the sheet size is Japanese chou 3, the sheet type is an envelope, and the sheet feeding port is auto or the rear tray. Under the settings of the PT 701 of FIGS. 7A to 7C, the sheet size is Japanese chou 3, the setting of the sheet feeding port is auto, and the sheet type is an envelope; this satisfies the condition under which it is necessary to display the guidance on the sheet setting method, and processing proceeds from step S602 to step S603.

Figure 8:
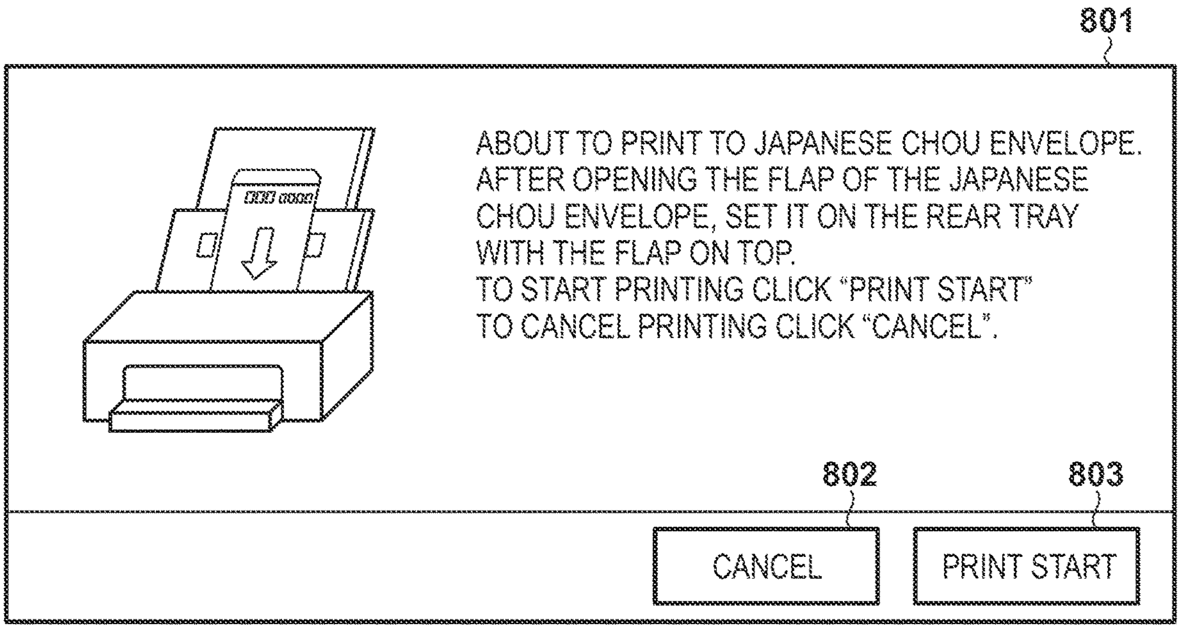
FIG. 8 is a diagram showing an example of a guidance screen regarding the sheet setting method, which is displayed in step S603 of FIG. 6.

FIG. 8 is a diagram showing an example of a guidance screen 801 regarding the sheet setting method, which is displayed in step S603.

This guidance screen 801 displays the setting direction of the sheet included in the print settings, and also a message and an image of an illustration that provide guidance indicating that, when the sheet is an envelope, the flap of the envelope is to be opened and the envelope is to be set on the rear tray with the flap located on top. Therefore, the user can set the sheet in line with this guidance. In a case where printing is to be executed with the sheet set on the print apparatus 102 in line with the guidance on this screen 801, the user confirms the set sheet, and then presses a print start button 803. On the other hand, in a case where printing is to be simply cancelled, the user presses a cancel button. Which one of the buttons has been pressed by the user is determined in step S604.

As described above, according to the first embodiment, the method of setting a print sheet can be accurately presented to the user by extending the function of providing guidance on the sheet setting method using the extension application. This can reduce a failure in printing caused by a mistake in the setting of the sheet.

Furthermore, although an envelope has been described as an example in the first embodiment, the sheet is not limited to the envelope, and similar advantageous effects can be achieved by providing guidance on the sheet setting method using any combination of a sheet type and a sheet size, as long as the orientation of the sheet has importance.

Note that in the first embodiment, the condition for displaying the guidance on the sheet setting method is that "the sheet size is Japanese chou 3, the sheet type is an envelope, and the sheet feeding port is auto or the rear tray". A combination of setting values other than the ones described above may be the condition for displaying the guidance on the sheet setting method, and the extension application may store a plurality of such conditions.

Also, although the determination is made based on the sheet size, the sheet type, and the setting of the sheet feeding port in the first embodiment, the guidance on the sheet setting method may be displayed based on the setting value of one of the setting items. For example, in a case where the sheet type is an envelope, the guidance on the sheet setting method may be provided regardless of the sheet size and the sheet feeding port.

Second Embodiment

Next, a second embodiment will be described. In the second embodiment, in a case where printing cannot be performed under the current print settings based on the print settings and information of sheets set on the print apparatus 102, printing is continued by automatically changing to the print settings under which printing can be performed. At this time, the extension application displays a screen for confirming whether the change to the print settings under which printing can be performed is permitted. Note that the configuration and processing that are not mentioned in the following description are equivalent to those of the first embodiment, and thus a description thereof is omitted.

Figure 9:
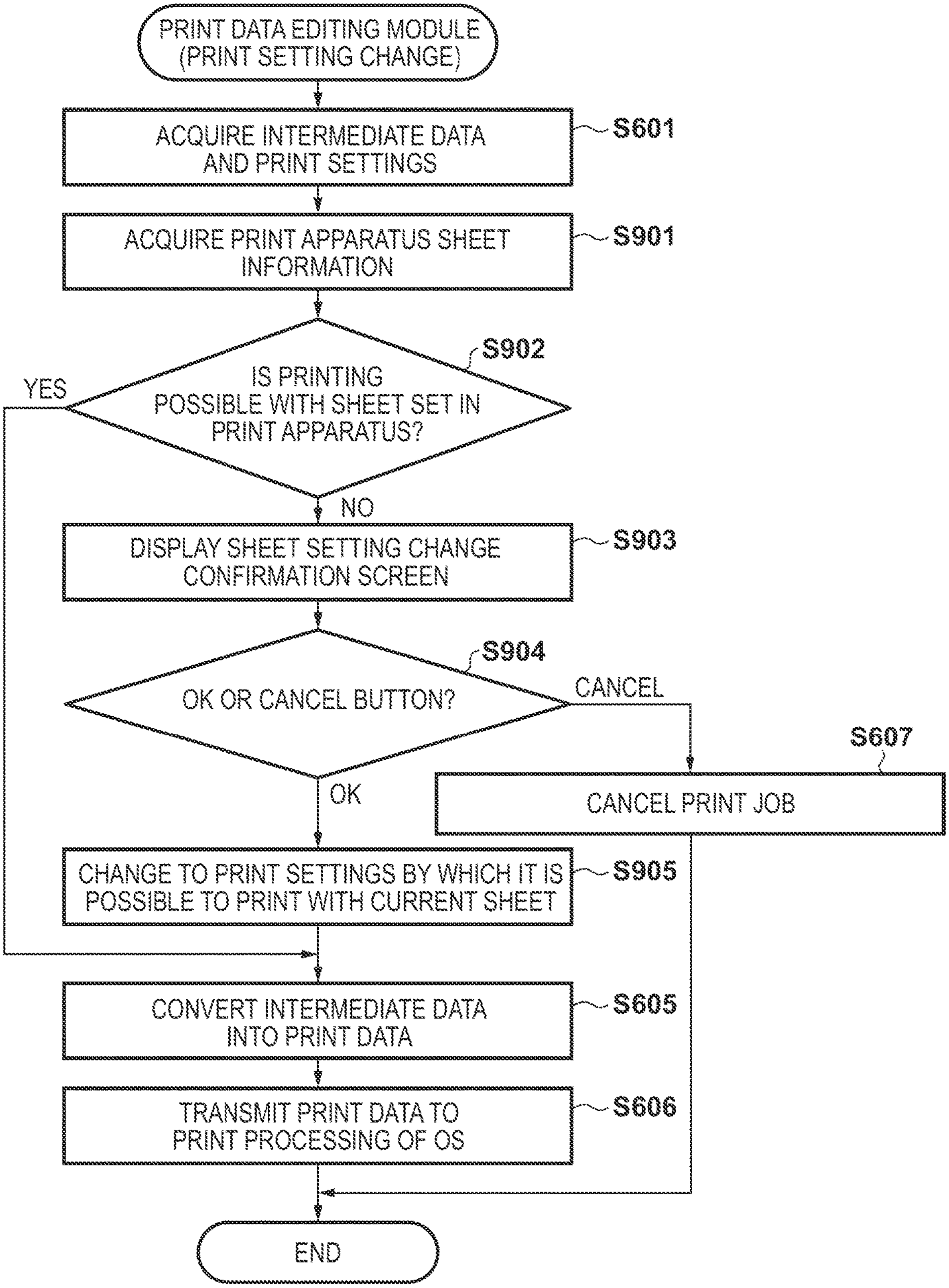
FIG. 9 is a flowchart illustrating processing executed by the print data editing module to change print settings in the print system according to a second embodiment.

FIG. 9 is a flowchart illustrating processing executed by the print data editing module 208 to change print settings in the print system according to the second embodiment. Note that as each processing step shown in this flowchart is realized by the CPU 111 executing the extension application 204 and each module, the CPU 111 will be described as a main executor of the processing. The processing shown in this flowchart is started when the print data editing module 208 has received intermediate data from the print data generation software 202. Note that in FIG. 9, processing steps that are the same as the above-described processing of FIG. 6 are given the same reference numerals thereas, and a description thereof is omitted.

In step S901, the CPU 111 that executes the print data editing module 208 acquires information of sheets that have been set on the respective sheet feeding ports of the print apparatus 102. Next, processing proceeds to step S902, and the CPU 111 determines whether printing can be performed as is by comparing the intermediate data received from the print data generation software 202 in step S601 and the print settings included in this intermediate data with information of sheets in the print apparatus 102 acquired in step S901. Here, printing cannot be performed in a case where the sheet feeding port, the sheet type, and the sheet size selected in the print settings are different from the information of sheets on the respective sheet feeding ports of the print apparatus 102. In a case where it has been determined that printing can be performed in step S902, a transition is made to processing of step S605.

On the other hand, in a case where the CPU 111 has determined that printing cannot be performed in step S902, processing proceeds to step S903, and a screen for confirmation on a change in the print settings is displayed on the display unit 119. The screen for confirming the change in the print settings will be described later with reference to FIG. 10. Then, processing proceeds to step S904, and the CPU 111 waits for the user to select a print start button 1003 or a cancel button 1002 on that screen. When the print start button 1003 has been pressed, processing proceeds to step S905, and the CPU 111 changes the print settings included in the intermediate data to the settings under which printing can be performed using a sheet set on the print apparatus 102, and then proceeds to step S605. On the other hand, when the cancel button 1002 has been selected, processing proceeds to step S607, and the CPU 111 executes processing for cancelling the print job and ends the present processing.

Figure 10:
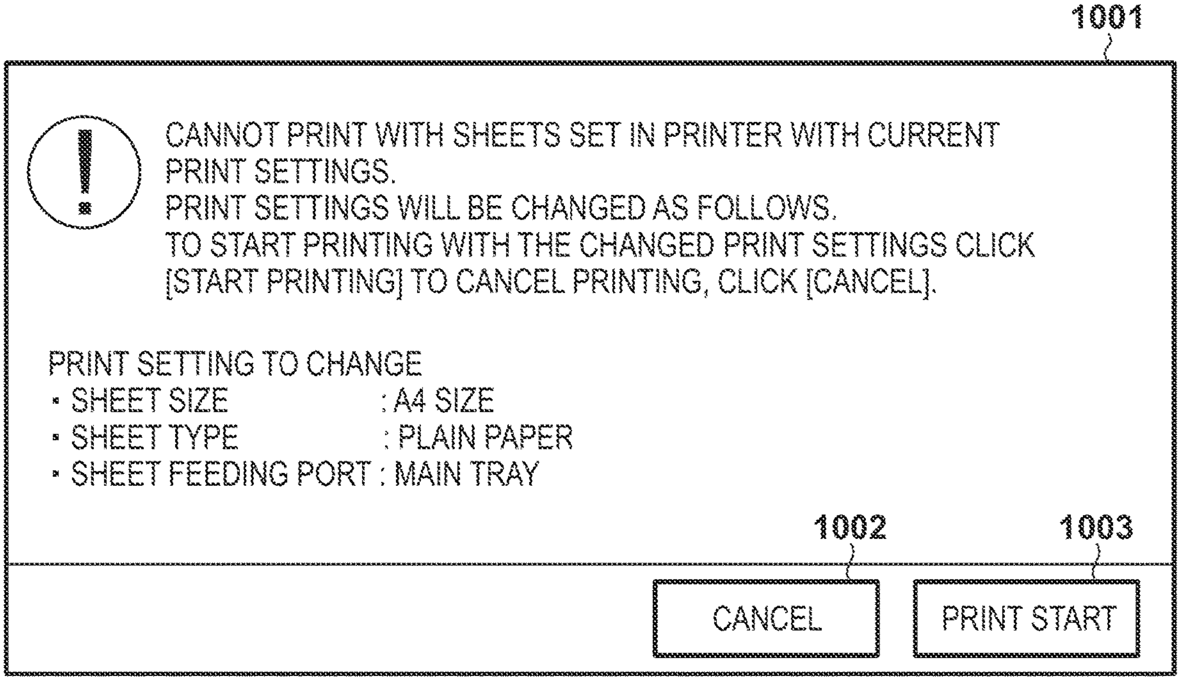
FIG. 10 is a diagram showing an example of a screen for confirming a change in print settings according to the second embodiment.

FIG. 10 is a diagram showing an example of the screen for confirming the change in the print settings according to the second embodiment.

This screen is displayed on the display unit 119 when step S903 of FIG. 9 is executed. This screen displays a message indicating that printing cannot be performed using the sheets set on the print apparatus 102 under the current print settings, and candidates for changed print settings (sheet size, sheet type, and sheet feeding port). Here, if the user agrees to perform printing under the changed print settings, the user selects the print start button 1003. In this case, the print settings are changed in accordance with this display, and the print job is executed using the print apparatus 102. On the other hand, if the user does not agree to perform printing under the changed print settings, the user selects the cancel button 1002. In this case, the print job is cancelled in step S607.

As described above, according to the second embodiment, even if the extension application has executed printing with the print settings under which printing cannot be performed on a print apparatus, print operations can be executed using this print apparatus by changing the print settings of this print apparatus to the print settings under which printing can be executed. Furthermore, the second embodiment may be combined with the first embodiment to form one print system.

Third Embodiment

Next, a third embodiment will be described. In the third embodiment, in a case where printing cannot be performed under the current print settings based on the print settings in print data and information of sheets set on the print apparatus, a screen providing a notification indicating that printing cannot be performed using the extension application is displayed. Note that the configuration and processing that are not mentioned in the following description are equivalent to those of the first embodiment and the second embodiment, and thus a description thereof is omitted.

Figure 11:
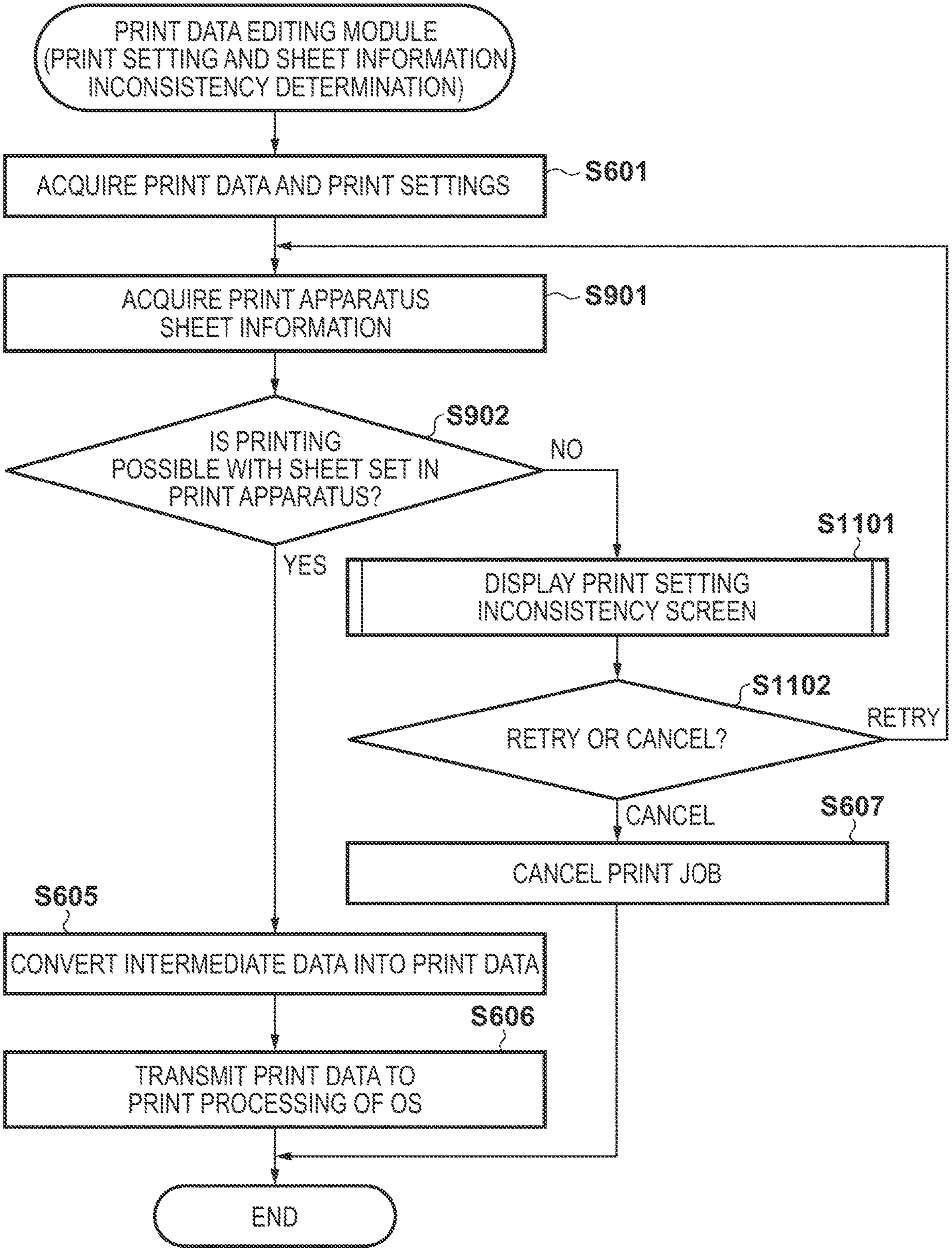
FIG. 11 is a flowchart illustrating processing executed by the print data editing module to display guidance indicating inconsistency between print settings and information of sheets in a print apparatus in the print system according to a third embodiment.

FIG. 11 is a flowchart illustrating processing executed by the print data editing module 208 to display guidance indicating inconsistency between print settings and information of sheets in the print apparatus 102 in the print system according to the third embodiment. Note that as each processing step shown in this flowchart is realized by the CPU 111 executing the extension application 204 and each module, the CPU 111 will be described as a main executor of the processing. The processing shown in this flowchart is started when the print data editing module 208 has received intermediate data from the print data generation software 202. Note that in FIG. 11, processing steps that are the same as the above-described processing of FIG. 6 and FIG. 9 are given the same reference numerals thereas, and a description thereof is omitted.

In step S902, the CPU 111 determines whether printing can be performed as is by comparing the intermediate data received from the print data generation software 202 and the print settings included in the intermediate data with information of sheets set on the respective sheet feeding ports of the print apparatus 102. In a case where it has been determined that printing cannot be performed here, processing proceeds to step S1101, and the CPU 111 displays, for example, a print setting inconsistency screen shown in FIGS. 13A and 13B. Then, in step S1102, the CPU 111 waits for the user to select a retry button or a cancel button on this screen. When the cancel button has been selected, processing proceeds to step S607, processing for cancelling the print job is executed, and the present processing is ended. On the other hand, when the user has selected the retry button in step S1102, processing proceeds to step S901 and the above-described processing is executed.

Figure 12:
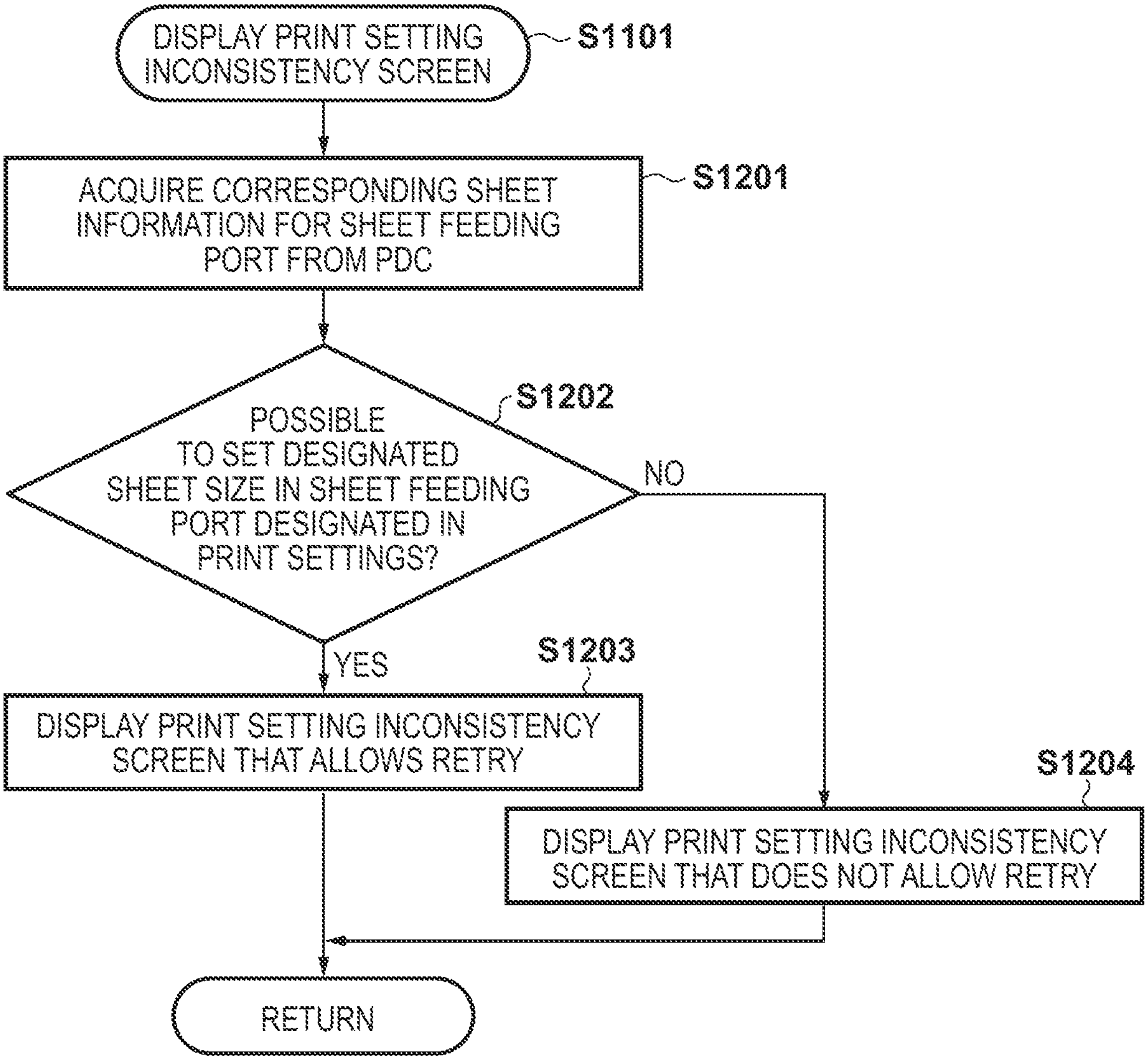
FIG. 12 is a flowchart illustrating processing for displaying a print setting inconsistency screen (step S1101), which is executed by the print data editing module according to the second embodiment.

FIG. 12 is a flowchart illustrating processing for displaying the print setting inconsistency screen (step S1101), which is executed by the print data editing module 208 according to the second embodiment. Note that as each processing step shown in this flowchart is realized by the CPU 111 executing the extension application 204 and each module, the CPU 111 will be described as a main executor of the processing.

First, in step S1201, the CPU 111 acquires PDC 203. Next, processing proceeds to step S1202, and the CPU 111 determines, with use of the PDC 203, whether a sheet of the sheet type and the sheet size designated in the print settings can be fed from the sheet feeding port designated in the print settings. In a case where the CPU 111 has determined that the sheet can be fed in step S1202, it proceeds to step S1203 and displays a print setting inconsistency screen that allows the execution of a retry where the sheet is changed and the determination is made again. On the other hand, in a case where the CPU 111 has determined that the sheet cannot be fed in step S1202, the CPU 111 proceeds to step S1204 and displays a print setting inconsistency screen that does not allow the execution of the retry.

Figure 13A:
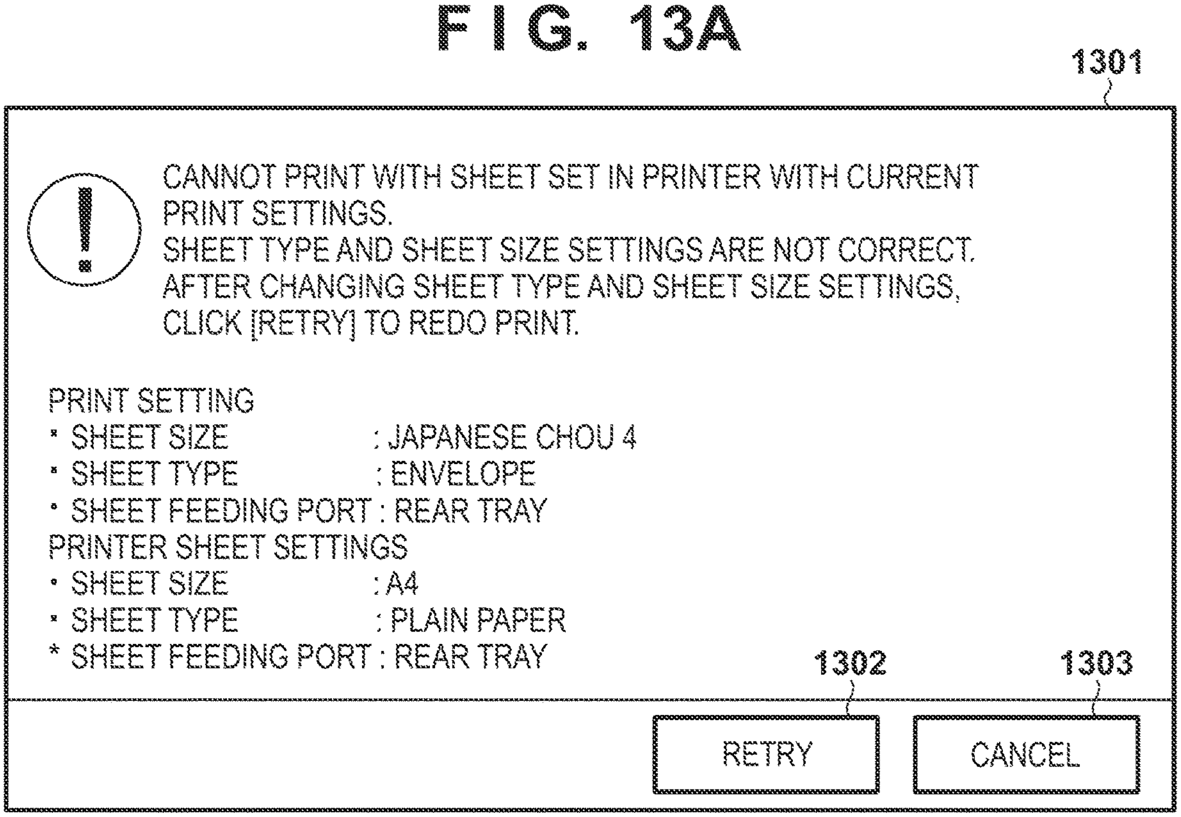
FIGS. 13A and 13B are diagrams showing examples of a print setting inconsistency screen according to the third embodiment.
Figure 13B:
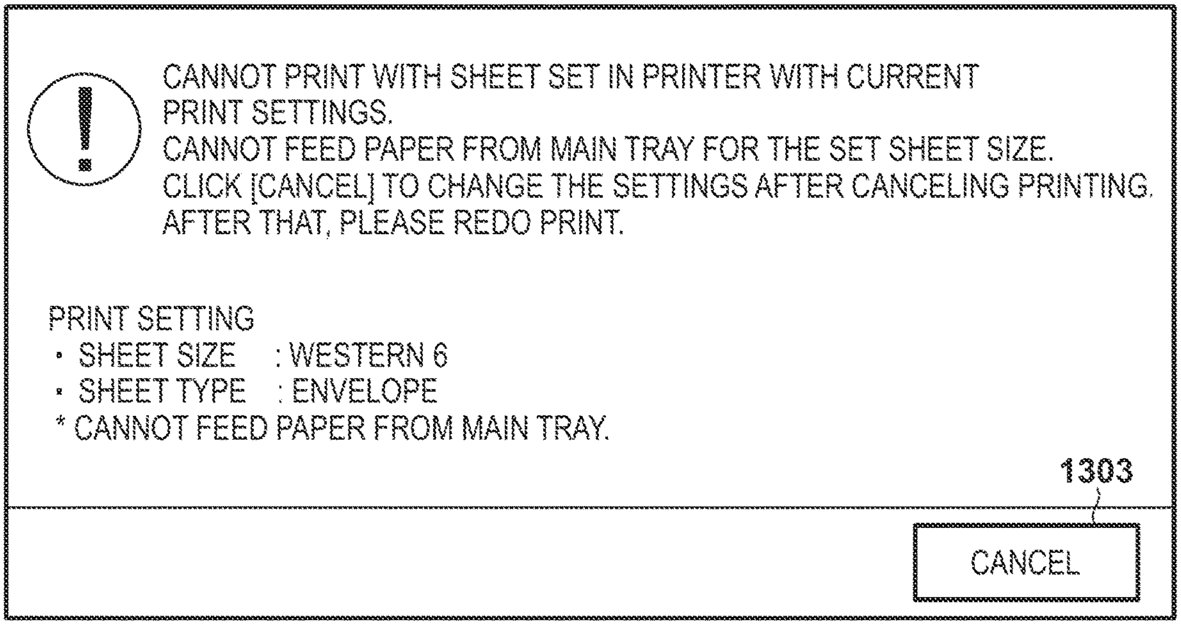

FIGS. 13A and 13B are diagrams showing examples of a print setting inconsistency screen according to the third embodiment.

FIG. 13A shows an example of a screen displayed in step S1203; in a case where the user is to change (re-set) the sheet set on the print apparatus 102 and perform a retry in accordance with an instruction on a screen 1301, the user selects a retry button 1302. On the other hand, in a case where printing is to be simply cancelled, the user selects a cancel button 1303. Which one of the buttons has been pressed by the user is determined by the CPU 111 in step S1102.

FIG. 13B is a screen displayed in step S1204; this is displayed in a case where a sheet has been designated that is not settable in the sheet feeding port of the print apparatus 102 designated in the print settings. In this case, printing cannot be performed using the print apparatus 102 under the current print settings. Therefore, the user selects a cancel button 1303 and cancels this print job. Which one of the buttons has been pressed by the user is determined by the CPU 111 in step S1102.

As described above, according to the third embodiment, even if the extension application has executed printing with the print settings under which printing cannot be performed on the print apparatus, the change in the print settings can be easily corrected by notifying the user of the reason why printing could not be carried out. Furthermore, the present embodiment may be combined with the first embodiment to form one print system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-070432, filed Apr. 21, 2023 which is hereby incorporated by reference herein in its entirety.

What is claimed is:

1. A non-transitory computer-readable storage medium storing an extension application program for extending a function of a print data generation software-commonly usable with respect to a plurality of different print apparatuses, and for causing a computer to execute each step in a method of controlling an information processing apparatus, the method comprising:

acquiring a print setting of a print job, the acquired print setting including at least a sheet size and a sheet type;

determining, based on at least the sheet size and the sheet type set in the acquired print setting, whether to display guidance on a method of setting a sheet on a print apparatus that executes printing based on the print job; and displaying, on a display unit of the information processing apparatus, a screen that includes the guidance on the method of setting the sheet, in a case where the determining determined that the guidance is to be displayed, wherein:

the guidance is displayed in a case where the sheet size and the sheet type set in the acquired print setting include a sheet that has a designated front side and a designated back side; and the guidance includes a message and an image of an illustration that describe the method of setting the sheet.

2. The non-transitory computer-readable storage medium according to claim 1, wherein the extension application program is activated in response to an occurrence of a print job for the print data generation software.

3. The non-transitory computer-readable storage medium according to claim 1, wherein the determining further determines whether to display the guidance by acquiring a print setting set on the print apparatus from the print apparatus.

4. The non-transitory computer-readable storage medium according to claim 1, the method further comprising storing a combination of the sheet type and the sheet size that acts as a criterion for displaying the guidance.

5. The non-transitory computer-readable storage medium according to claim 1, wherein the screen further includes a button that issues an instruction for causing the print apparatus to start printing.

6. A non-transitory computer-readable storage medium storing an extension application program for extending a function of a print data generation software commonly usable with respect to a plurality of different print apparatuses, and for causing a computer to execute each step in a method of controlling an information processing apparatus, the method comprising:

acquiring a first print setting of a print job, the acquired first print setting including at least a sheet size, a sheet type, and a selection of a sheet feeding port for the set sheet size and the set sheet type;

acquire a second print setting set on a print apparatus;

determining, based on at least the sheet size, the sheet type, and the selection of the sheet feeding port set in the acquired first print setting, whether the print job is performable under the acquired second print setting set, wherein:

the determining determines that the print job cannot be performed in a case where the sheet size and the sheet type set in the first acquired print setting include a sheet that has a designated front side and a designated back side, and the acquired second print setting is set to:

a sheet size and a sheet type that do not match with the sheet size and the sheet type set in the acquired first print setting; or a sheet feeding port that does not feed the sheet size and the sheet type set in the acquired second print setting; and displaying, on a display unit of the information processing apparatus, a screen with a message indicating that printing cannot be performed, in a case where the determining determined that the print job cannot be performed.

7. The non-transitory computer-readable storage medium according to claim 6, wherein the screen includes a print setting obtained by changing the acquired second print setting to perform printing under the acquired first print setting of the print job.

8. The non-transitory computer-readable storage medium according to claim 7, wherein the screen further includes a button that issues an instruction for starting printing under the changed print setting.

9. The non-transitory computer-readable storage medium according to claim 6, wherein the screen further displays the first acquired print setting and the acquired second print setting set, along with the message.

10. The non-transitory computer-readable storage medium according to claim 9, wherein the screen further displays a retry button that reacquires the second print setting on the print apparatus in a case where the sheet feeding port selected on the print apparatus does not match the sheet feeding port set in the first acquired print setting.

11. An information processing apparatus that executes an extension application program for extending a function of a print data generation software commonly usable with respect to a plurality of different print apparatuses, the information processing apparatus comprising:

a display unit;

one or more memory devices that store instructions; and one or more processors that execute the instructions to:

acquire a print setting of a print job, the acquired print setting including at least a sheet size and a sheet type;

determine, based on at least the sheet size and the sheet type set in the acquired print setting, whether to display guidance on a method of setting a sheet on a print apparatus that executes printing based on the print job; and display, on the display unit, a screen that includes the guidance on the method of setting the sheet, in a case where the one or more processors determined that the guidance is to be displayed, wherein:

the guidance is displayed in a case where the sheet size and the sheet type set in the acquired print setting print setting include a sheet that has a designated front side and a designated back side; and the guidance includes a message and an image of an illustration that describe the method of setting the sheet.

12. An information processing apparatus that executes an extension application program for extending a function of a print data generation software commonly usable with respect to a plurality of different print apparatuses, the information processing apparatus comprising:

a display unit;

one or more memory devices that store instructions; and one or more processors that execute the instructions to:

acquire a first print setting of a print job, the acquired first print setting including at least a sheet size, a sheet type, and a selection of a sheet feeding port for the set sheet size and the set sheet type;

acquire a second print setting set on a print apparatus;

determine, based on at least the sheet size, the sheet type, and the selection of the sheet feeding port set in the acquired first print setting, whether the print job is performable under the acquired second print setting, wherein:

the print job is determined to be not performable in a case where the sheet size and the sheet type set in the first acquired print setting include a sheet that has a designated front side and a designated back side, and the acquired second print setting is set to:

a sheet size and a sheet type that do not match with the sheet size and the sheet type set in the acquired first print setting; or a sheet feeding port that does not feed the sheet size and the sheet type set in the acquired second print setting; and display, on the display unit, a screen with a message indicating that printing cannot be performed, in a case where the print job is determined to be not performable.

* * * * *